United States Patent [19]

Greene

[11] Patent Number: 4,652,285

[45] Date of Patent: Mar. 24, 1987

[54] GAS FILTER APPARATUS

[76] Inventor: John P. Greene, Cheryl Lane, Boonton Township, Morris County, N.J. 07005

[21] Appl. No.: 543,502

[22] Filed: Oct. 19, 1983

[51] Int. Cl.$^4$ ............................................. B01D 46/02
[52] U.S. Cl. ........................................ 55/498; 55/499; 55/501; 55/521; 55/302; 210/493.1; 210/493.5
[58] Field of Search .................. 55/302, 497, 498–501, 55/510, 521, 524; 210/493.1, 493.2, 493.5

[56] References Cited

U.S. PATENT DOCUMENTS

| | | | |
|---|---|---|---|
| 2,663,660 | 12/1953 | Layte | 55/521 |
| 3,417,551 | 12/1968 | Bonell | 55/521 |
| 4,075,106 | 2/1978 | Yamazaki | 210/493.1 |
| 4,277,260 | 7/1981 | Browning | 55/302 |
| 4,289,510 | 9/1981 | Herndon, Jr. | 55/498 |
| 4,322,231 | 3/1982 | Hilzendeger et al. | 55/498 |
| 4,402,830 | 9/1983 | Pall | 210/493.2 |

FOREIGN PATENT DOCUMENTS

| | | | |
|---|---|---|---|
| 88821 | 7/1980 | Japan | 55/521 |
| 630548 | 10/1949 | United Kingdom | 210/493.1 |

Primary Examiner—David L. Lacey
Attorney, Agent, or Firm—Bernard J. Murphy

[57] ABSTRACT

A filter apparatus includes a filter element. The filter element is formed of a sheet of gas-porous filter material which has been folded into accordian pleats. Alternate pleat-folds are of tight, near knife-edge definition, and arcuate form definition. Hence, all folds on one side of the accordian-folded material are of the knife-edge form, and all folds on the other side are of the arcuate. The pleated material is turned into a cylindrical conformation, with the arcuate folds confronting the central axis of the cylinder, and the tight, knife-edge folds outwardly directed. An adhesive-backed band circumscribes the cylinder to hold the accordian-folded material in such form. Ends caps, one with a central aperture formed therein, are fixed to the ends of the cylinder. The latter is then positioned and secured under a venturi section or pipe. The venturi section or pipe, in any cross-section thereof, is of rectilinear shape.

11 Claims, 10 Drawing Figures

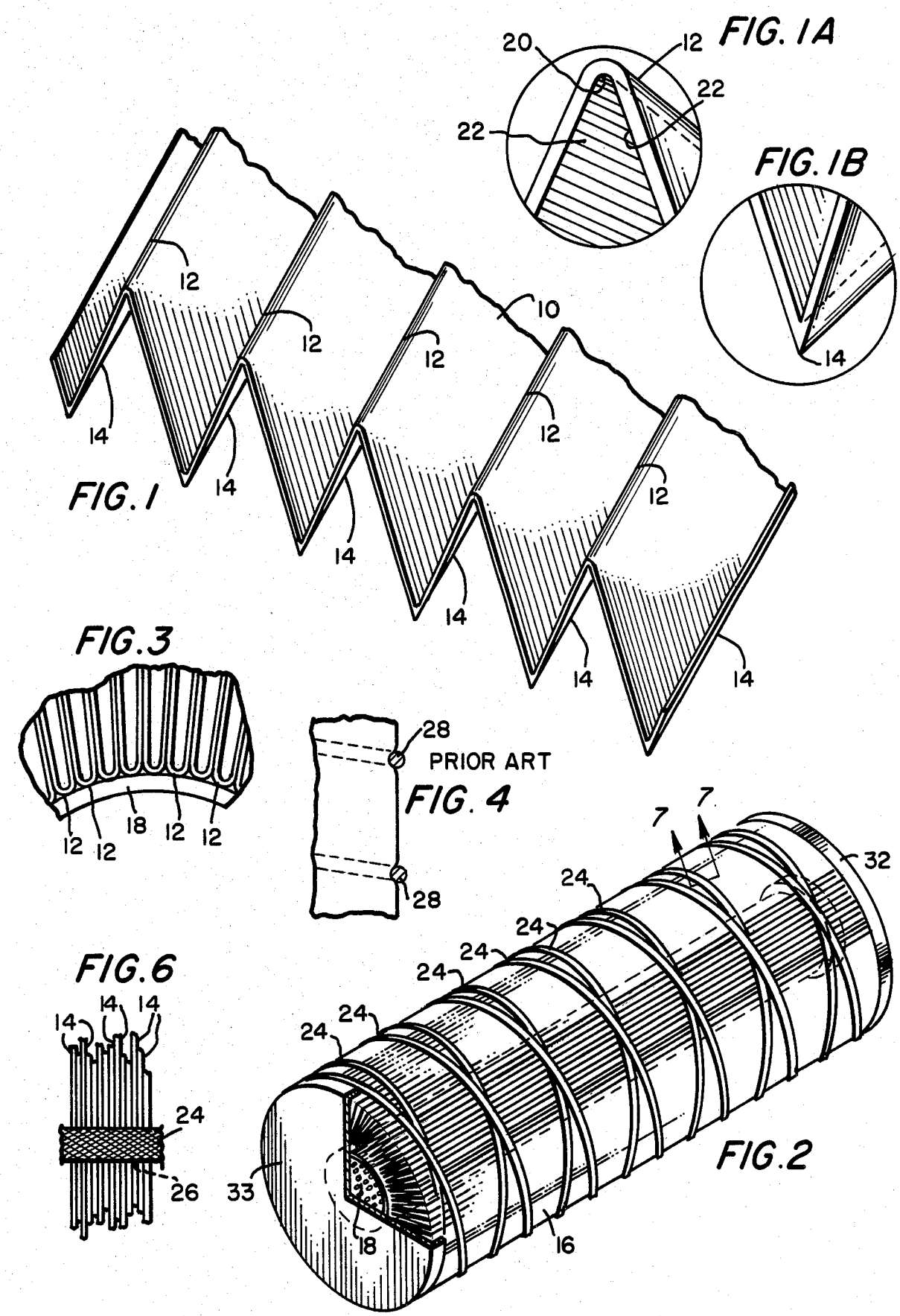

GAS FILTER APPARATUS

This invention pertains to filter elements for filters, and in particular to such filter elements for filters formed of gas-porous filter material, for separating out particulate matter carried by gas streams.

Filter elements of the type to which the invention pertains are well known in the prior art, and typically are formed of accordian-pleated filter material which is then turned into cylindrical form. The pleated material is held in the cylindrical form by inner and outer sleeves of metal, of the filter structure, which have a great multiplicity of holes formed therein. Now, notwithstanding the fact that the sleeves are greatly holed, the mass of remaining metal defines a barrier to the throughput of gas. In an attempt to avoid this, filters known in the prior art, i.e., those which admit the particulate matter-bearing gas thereto, radially, and draw out the filtered gas, axially, use the inner sleeve, but simply bind the outer circumference of the filter cylinder with cord. This practice is unacceptable, as the cord, where it traverses the folds of the material, bears on substantially a line contact. Such localized constraint and stress, causes the traversed folds to yield and define depressions which, consequently, weaken the axial strength of the filter fully thereabout.

It is a common practice in the prior art, also, to set a venturi pipe atop the cylindrical filter element, the pipe serving as an exit conduit for the filtered gas, and an entry conduit for cyclically-used blasts of compressed air for "reverse flow cleansing" of the filter element. In order that the supplied compressed air will ingest ambient air, to aid in the filter element cleansing, the known pipes take the venturi form, as just noted. However, the classic venturi shape defines a more restricted throat than is desirable which, consequently, inhibits the exit of filtered gas from the filter element.

It is an object of this invention to set forth a filter element which avoids the disadvantages, cited in the foregoing, through an improved structure thereof. It is particularly an object of this invention to disclose, in a filter, a filter element comprising a sheet of gas-porous filter material; said sheet having folds on substantially parallel and spaced-apart lines to define thereof a multiplicity of accordian pleats; wherein a first set of said folds, the same being alternate ones on said fold lines, are of tight, near knife-edge definition; and a second set of said folds, the same being all the other said folds which intervene said folds of said first set, are of arcuate definition.

Further objects of this invention, as well as the novel features thereof, will become more apparent by reference to the following description, taken in conjunction with the accompanying figures, in which:

FIG. 1 is an isometric projection of a portion of the accordian-pleated filter material, according to an embodiment of the invention;

FIG. 1a is an isometric projection, enlarged over the scale of FIG. 1, of a fold of one of the folds of a given set thereof which define the accordian pleating;

FIG. 1b is an isometric projection, on the scale of FIG. 1a, of a fold of one of the folds of the alternate set thereof;

FIG. 2 is a perspective view of the accordian-folded, cylindrically formed and banded filter element, a sector of the lower end cap being cut away;

FIG. 3 is a fragmentary view, in plan, of the inner circumference of the filter element of FIG. 2, the end cap therefor having been removed for clarity;

FIG. 4 is a fragmentary view, in cross-section, of a portion of one of the cord-constrained filter elements known in the prior art;

FIG. 6 is a fragmentary view, in elevation, of the outer surface of the filter element of FIG. 2 showing the novel banding employed therewith;

Figure 5:
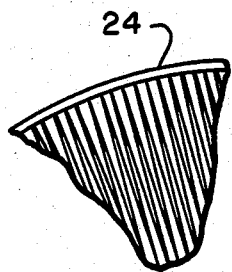
FIG. 5 is a fragmentary view, in plan, of the outer curcumference of the filter element of FIG. 2, again with the end cap omitted for clarity.
Figure 7:
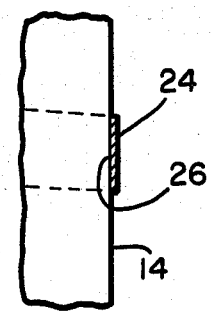
FIG. 7 is a view like that of FIG. 4 showing, however, the improved banding according to the invention.

As shown in the Figures, a sheet 10 of gas-porous filter material has a multiplicity of fold lines, and is folded thereon to define accordian pleats. The pleating folds 12 of a first set thereof, being alternate ones in said sheet, are of arcuate definition, and the folds 14 which intervene are of tight, near knife-edge definition. According to the invention, the pleated sheet 10 is turned into a cylindrical filter element 16 about an apertured sleeve 18 of a filter. The sleeve 18 gives the cylindrical filter element 16 a desired support and rigidity, and is a known practice in filter construction. Contrary to the known practice, however, the outer surface of the cylinder 16 is not confined within a second apertured sleeve.

The sheet 10, as noted, is formed into the cylindrical filter element 16 and, upon this being done, the folds 14 are disposed on the outer circumference of the element, and the folds 12 interface the sleeve 18 of a filter. According to this novel teaching, then, the tight, near knife-edge folds 14 present the minimum surface in confrontation to particulate-laden gas addressed thereto. The inner folds 12, however, for having an arcuate conformation, more efficiently interrupt particulate and hold the latter thereat. Each fold 12 defines a trough 20 having a radius to which the inner sides 22 of the fold are tangent. Hence, particles which travel along the sides 22, with their given velocity, are diverted and decelerated as the tangential portions of the sides describe the radiused trough 20. Particles, accordingly, more readily collect in the troughs 20, while the gas simply passes through the material of the sheet 10. The aforesaid, of course, pertains to those circumstances in which the outer circumference of the filter element 16 is to receive the particle-laden gas; hence, folds 14 comprise the gas-admitting side of the sheet 10 or element 16, and folds 12 comprise the gas-discharging side of the sheet 10 or element 16.

The outer circumference of the element 16, when incorporated in an overall filter structure, is not enclosed within an apertured sleeve, like sleeve 18. Rather, the element 16 is banded. The banding 24 is a glass-fiber material which has an adhesive 26 on the folds-engaging surface thereof. The banding 24 is enwrapped about the element 16 at each of the opposite ends thereof, and helically wrapped thereabout. The cumulative area of the banding, which defines a barrier to the ingestion of gas, is negligible. The prior art practices, which dispense with the outer sleeve of a filter structure, use enwrapping cord 28 and, due to the circular cross-section of the cord 28, it bears against the element folds on substantially line contacts. It can be appreciated that, with time, and vibration of the filter, the cord 28 insinuates itself into the folds. The folds have depressions formed therein, and the axial strength of the filter is seriously diminished. The improved practice set forth herein, of the use of banding 24, avoids the just-cited limitation. The banding 24 is of thin gauge, and has an adequate width to distribute the constraint thereof over a wider length of folds 14.

As a practical matter, the cylindrical element 16 is a somewhat loose, amorphous-like entity to handle and, as a consequence, it is necessary to fix its cylindrical conformation before the banding can be done with any facility. For the retention of the cylinder element 16 in cylindrical form during use, the ends thereof receive end caps 32 and 33. The lower end cap 33, shown partially cut away in FIG. 2, is not apertured. The upper end cap 32 is centrally apertured. Both caps are secured to the ends of the cylinder element 16 by adhesive, and following this the banding can be performed.

As described, the banding 24 is enwrapped about the element 16 in a helical manner. This is exemplary of a preferred practice. Where the banding 24 crosses itself, upon the helical enwrapping being wound fully along the element in a first direction, and then returned in the opposite direction, such crossings help to secure the banding in place. This exemplary practice is less subject to banding displacement due to vibration of the filter during use. However, the invention comprehends individual bands of banding 24, wrapped about the element 16 in spaced apart, horizontal planes. If such are adequately fixed in place with adhesive, they can resist displacement.

Figure 10:
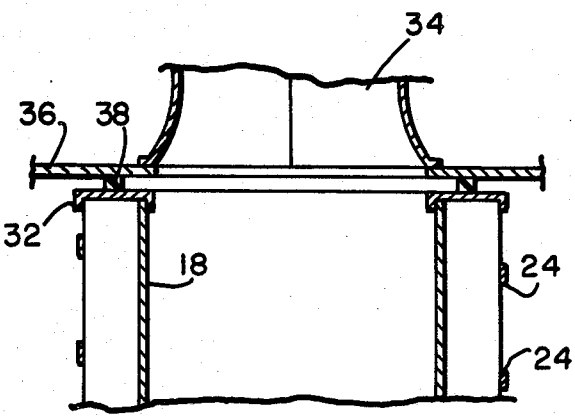
FIG. 10 is a cross-section taken along 10—10 of FIG. 8.
Figure 8:
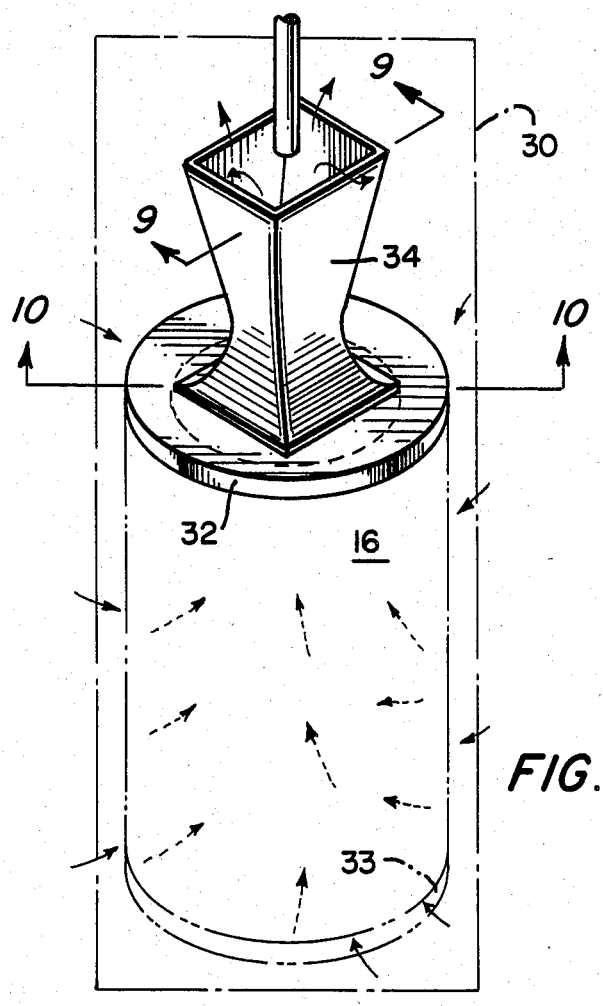
FIG. 8 is a perspective view of the inventive filter element, according to the preferred embodiment thereof, with its mating and cooperating end caps and venturi section or pipe.

In conventional use, the filter element 16 is confined within a housing 30, with its banding 24, apertured sleeve 18 therewithin, and end caps 32 and 33 fixed thereto. Such a housing is shown only symbolically in FIG. 8. A venturi section or pipe 34 is supported on an apertured platform 36 which traverses the housing 30. The platform 36 (omitted from FIG. 8) is shown cross-sectioned in FIG. 10. It is set upon an annulus 38 which, in turn, sets upon the upper end cap 32. The venturi section or pipe 34 provides an exit conduit for the filtered gas, and defines an entry conduit for cyclically-used blasts of cleansing air.

The section or pipe 34 is of venturi configuration to ingest ambient air, with the cyclically introduced cleansing air, to facilitate such cleansing. This practice is well known in the relevant technology, and needs no detailed discussion here. The commonly used venturi sections or pipes, however, are of the classic conformation in which, in any cross-section thereof, they are circular. According to the instant invention, the section or pipe 34, in any cross-section thereof is rectilinear. This is done to accommodate a flow of filtered gas therethrough with less throttling than is experienced with the classic venturi section or pipe.

Figure 9:
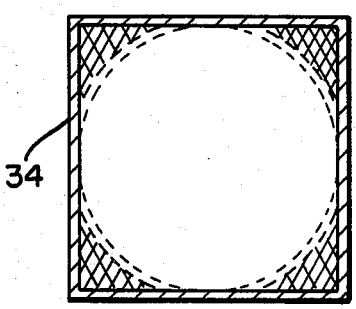
FIG. 9 is a cross-sectional view of the venturi pipe, taken along section 9—9 of FIG. 8, having a classic venturi pipe cross-section superimposed thereon, in phantom.

The cross-sectional illustration, in FIG. 9, draws a comparison between the area encompassed by the novel, rectilinear venturi section or pipe 34, and the area encompassed by the known, classic, circular venturi section or pipe. The singly cross-hatched structure in FIG. 9, of course, is the novel venturi section or pipe 34. The phantomed, circular structure represents the expanse of a prior art venturi section or pipe. The double cross-hatched areas in the figure show the added expanse of the pipe provided by this invention.

It has been determined by test and measurement that the rectilinear venturi section or pipe 34 is full acceptable and functional for filter cleansing, and ambient air ingestion purposes. It has a thoroughly adequate venturi effect. More interestingly, however, its throttling of the exiting, filtered gas is substantially insignificant, and markedly less than that arising from the employment of a classic venturi section or pipe.

While the invention has been described in connection with a specific embodiment thereof, it is to be clearly understood that this is done only by way of example, and not as a limitation to the scope of the invention, as set forth in the objects thereof and in the appended claims.

I claim:

1. In a filter apparatus having a filter element with a first surface disposed for admitting particulate-laden gas therethrough, and a second surface for discharging particulate-filtered gas therethrough, said filter element comprises
   a sheet of gas-porous filter material;
   said sheet having folds on substantially parallel and spaced-apart fold lines to define thereof a multiplicity of accordian pleats; wherein
   a first set of said folds, the same being alternate ones on said fold lines, are of tight, near knife-edge definition; and
   a second set of said folds, the same being all the other of said folds which intervene said folds of said first set, are of arcuate definition; wherein
   said first set of folds comprise said first surface of the filter.

2. A filter apparatus, according to claim 1, wherein:
   said pleated sheet is in the shape of a hollow cylinder, having a central axis, with said folds lying, substantially, on radial planes drawn from said axis.

3. A filter apparatus, according to claim 2, further including:
   means circumscribing said pleated sheet so as to maintain it in cylindrical form.

4. A filter apparatus, according to claim 3, further including:
   an end cap fixed to one end of said cylinder;
   said cap having an aperture formed in the center thereof; and
   means defining a venturi pipe, fixed to said cap.

5. A filter apparatus, according to claim 4, wherein:
   said venturi pipe has a central axis; and
   in any cross-section through said pipe, on a plane normal to said axis, said pipe is of rectilinear conformation.

6. A filter apparatus, according to claim 2, wherein:
   one set of folds, of said first and second set thereof, is inwardly directed toward said axis; and
   the other set of folds, of said first and second set thereof, is outwardly directed to define the outermost surface of said cylinder.

7. A filter apparatus, according to claim 6, further including:
   means holding said pleated sheet in cylindrical form; wherein
   said holding means comprises means circumscribing said cylinder; and said cylinder circumscribing means comprises banding means having a surface which engages and traverses said folds of said other set thereof.

8. A filter apparatus, according to claim 7, wherein: said banding means comprises (a) a flat band having a width which is considerably greater than the thickness thereof, and (b) adhesive, on said surface which engages and traverses said folds of said other set thereof, to cause said surface to adhere to the engaged folds.

9. A filter apparatus according to claim 7, wherein: said banding means circumscribes said cylinder at each of the extreme ends of said cylinder.

10. A filter apparatus according to claim 7, wherein: said banding means circumscribes said cylinder in a helically-defined wrap.

11. A filter apparatus, according to claim 7, wherein: said banding means circumscribes said cylinder in a plurality of helically-defined wraps.

* * * * *